US011275628B2

(12) United States Patent
Cui

(10) Patent No.: US 11,275,628 B2
(45) Date of Patent: Mar. 15, 2022

(54) NOTIFICATION INFORMATION OUTPUT METHOD, SERVER AND MONITORING SYSTEM

(71) Applicant: HANGZHOU HIKVISION DIGITAL TECHNOLOGY CO., LTD., Hangzhou (CN)

(72) Inventor: Zhi Cui, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 187 days.

(21) Appl. No.: 16/622,159

(22) PCT Filed: Jun. 8, 2018

(86) PCT No.: PCT/CN2018/090388
§ 371 (c)(1),
(2) Date: Dec. 12, 2019

(87) PCT Pub. No.: WO2018/228280
PCT Pub. Date: Dec. 20, 2018

(65) Prior Publication Data
US 2020/0364097 A1 Nov. 19, 2020

(30) Foreign Application Priority Data
Jun. 12, 2017 (CN) .......................... 201710436582.1

(51) Int. Cl.
*G06F 9/54* (2006.01)
*G06F 16/65* (2019.01)
(Continued)

(52) U.S. Cl.
CPC .............. *G06F 9/542* (2013.01); *G06F 16/65* (2019.01); *G10L 25/03* (2013.01); *G10L 25/54* (2013.01)

(58) Field of Classification Search
CPC ......... G06F 9/4812; G06F 9/542; H04L 29/06
(Continued)

(56) References Cited

U.S. PATENT DOCUMENTS 10,109,299 B2 * 10/2018 Kuroki ............... G08B 13/1672
2014/0088960 A1 3/2014 Nonaka

FOREIGN PATENT DOCUMENTS

CN 101421707 4/2009
CN 101587710 11/2009
(Continued)

OTHER PUBLICATIONS

International Search Report and Written Opinion issued in corresponding PCT Application No. PCT/CN2018/090388, dated Sep. 13, 2018 (English translation of International Search Report provided).

(Continued)

*Primary Examiner* — Andy Ho
(74) *Attorney, Agent, or Firm* — Norton Rose Fulbright US LLP

(57) ABSTRACT

A method for outputting notification information, a server and a monitoring system are provided. In the method, a database including a correspondence between feature value models and forewarning levels is constructed in advance; a feature value of the audio information is acquired (S102), the acquired feature value is matched with the feature value models in the database (S103), and then a forewarning level corresponding to the audio information is determined (S104); the notification information is output (S107) when the forewarning level meets a preset condition (S105). It can be seen that, the notification information is output by analyzing the audio information, without determining the active targets in the video image; even if there are many active targets in the scene and the trajectories thereof are confus- (Continued)

ing, the notification information may still be accurately output.

20 Claims, 4 Drawing Sheets

(51) Int. Cl.
*G10L 25/03* (2013.01)
*G10L 25/54* (2013.01)

(58) Field of Classification Search
USPC .......................................................... 719/318
See application file for complete search history.

(56) References Cited

FOREIGN PATENT DOCUMENTS

| CN | 102521945 | 6/2012 |
|---|---|---|
| CN | 102810311 | 12/2012 |
| CN | 102970438 | 3/2013 |
| CN | 103198838 | 7/2013 |
| CN | 103366740 | 10/2013 |
| CN | 103456301 | 12/2013 |
| CN | 104036617 | 9/2014 |
| CN | 104156297 | 11/2014 |
| CN | 104239372 | 12/2014 |
| CN | 104347068 | 2/2015 |
| CN | 104795064 | 7/2015 |
| CN | 105022835 | 11/2015 |
| CN | 105679313 | 6/2016 |
| CN | 105812721 | 7/2016 |
| CN | 106558317 | 4/2017 |
| EP | 3059733 | 8/2016 |
| EP | 3147902 | 3/2017 |

OTHER PUBLICATIONS

Office Action issued in Corresponding Chinese Application No. 201710436582.1, dated Mar. 3, 2021 (English Translation provided).

Zhu et al., "Progress in Research in Archival Science". Wuhan University Press, 2007, pp. 438-441.

Extended European Search Report issued in Corresponding European Application No. 18817001.3, dated May 15, 2020.

Office Action issued in Corresponding Chinese Application No. 201710436582.1, dated Jul. 3, 2020 (English Translation Provided).

\* cited by examiner

NOTIFICATION INFORMATION OUTPUT METHOD, SERVER AND MONITORING SYSTEM

CROSS-REFERENCE TO RELATED APPLICATIONS

The present application is a national phase under 35 U.S.C. § 371 of International Application No. PCT/CN2018/090388, filed Jun. 8, 2018, which claims priority to Chinese Patent Application No. 201710436582.1, filed with the China National Intellectual Property Administration on Jun. 12, 2017 and entitled "Notification Information Output Method, Server And Monitoring System", each of which are incorporated herein by reference in their entirety.

TECHNICAL FIELD

The present application relates to the field of multimedia information processing technology, and in particular, to a method for outputting notification information, a server and a monitoring system.

BACKGROUND

During a process of video monitoring, it is usually necessary to output notification information for some abnormal events to remind a relevant person to deal with the abnormal events in time. For example, when a robbery event occurs in a captured video image, the notification information needs to be output for the robbery event. Alternatively, during a process of video monitoring for a cashier desk in a mall or supermarket, if there is a property dispute, the notification information may also be outputted and so on.

Currently, the solution for outputting the notification information generally includes: analyzing a video image captured by a video capture device, for example, determining an active target in the video image, and a motion trajectory of the active target; based on the analysis result, determining whether an abnormal event occurs in the video image; if an abnormal event occurs in the video image, outputting the notification information.

However, when the notification message is output in the above manner, if there are many active targets in the video image and the trajectories of the active targets are confusing, it is difficult to accurately determine whether an abnormal event has been occurred for each active target, resulting in a lower accuracy for outputting the notification information.

SUMMARY

An objective of embodiments of the present application is to provide a method for outputting notification information, a server and a monitoring system, to improve the accuracy for outputting the notification information.

To achieve the above objective, an embodiment of the present application discloses a method for outputting notification information, including:
 acquiring audio information;
 extracting a feature value of the audio information;
 matching the extracted feature value with feature value models in a preset database; wherein, the database stores a correspondence between the feature value models and forewarning levels;
 determining a forewarning level corresponding to the audio information based on a matching result;
 determining whether the forewarning level meets a preset condition; if the forewarning level meets the preset condition, determining notification information corresponding to the audio information; and
 outputting the notification information which is determined.

Optionally, the feature value models include a scene sound model, and the scene sound model is a feature value model constructed for a preset scene sound.

Matching the extracted feature value with feature value models in a preset database, may include:
 matching the extracted feature value with the scene sound model.

Optionally, after acquiring the audio information, the method may further include:
 determining whether the audio information is multi-type audio information; wherein, the multi-type audio information includes multiple types of sounds;
 if the audio information is the multi-type audio information, decomposing firstly the multi-type audio information into at least one piece of single-type audio information; wherein, each piece of single-type audio information includes one type of sound; performing the step of extracting a feature value of the audio information;
 if the audio information is not the multi-type audio information, performing the step of extracting a feature value of the audio information.

Extracting a feature value of the audio information, includes:
 extracting a feature value of each piece of single-type audio information.

Matching the extracted feature value with feature value models in a preset database, includes:
 for each piece of single-type audio information, matching the feature value extracted from the piece of single-type audio information with the feature value models in the preset database.

Determining a forewarning level corresponding to the audio information based on a matching result, includes:
 if the audio information is the single-type audio information,
 determining a forewarning level corresponding to the single-type audio information based on the matching result;
 if the audio information is the multi-type audio information,
 obtaining a matching result corresponding to each piece of single-type audio information included in the multi-type audio information;
 determining a weight corresponding to each piece of the single-type audio information; and
 determining, based on the determined weights and the matching results, a forewarning level corresponding to the multi-type audio information.

Optionally, decomposing the multi-type audio information into at least one piece of single-type audio information, may include:
 segmenting the multi-type audio information into multiple audio segments based on a preset segmentation rule;
 for each of the multiple audio segments:
 determining whether the audio segment includes multiple types of sounds;
 if the audio segment does not include multiple types of sounds, determining the audio segment as one piece of single-type audio information; and
 if the audio segment includes multiple types of sounds, decomposing the audio segment into at least one piece of single-type audio information based on a sound parameter in the audio segment; wherein, the sound parameter includes one or more of: tone, loudness, timbre.

Optionally, in a case that the audio information is determined as the multi-type audio information, the method may further include:

matching the multi-type audio information with at least one preset scene sound model;

determining each of scene sounds included in the multi-type audio information based on a matching result;

determining a forewarning level and a weight corresponding to each of the scene sounds;

wherein decomposing the multi-type audio information into at least one piece of single-type audio information, may include:

determining voice information included in the multi-type audio information;

determining each piece of single-type audio information corresponding to the voice information based on the timbre of the voice information;

wherein determining, based on the determined weights and the matching results, a forewarning level corresponding to the multi-type audio information, may include:

determining the forewarning level corresponding to the multi-type audio information based on the weight and the matching result corresponding to each piece of single-type audio information and the forewarning level and the weight corresponding to each of the scene sounds.

Optionally, determining notification information corresponding to the audio information, may include:

acquiring a video image and/or geographic location information corresponding to the audio information; and determining the video image and/or the geographic location information as the notification information corresponding to the audio information.

Optionally, before outputting the notification information which is determined, the method may further include:

prompting a user to determine whether to output the notification information;

determining whether rejection information is received from the user within a preset time period; and if no rejection information is received from the user within the preset time period, performing the step of outputting the notification information which is determined.

Optionally, the database is constructed by:
acquiring analog audio information of abnormal events;
extracting feature values of the analog audio information;
constructing feature value models based on the extracted feature values; and
storing the constructed feature value models into the database in association with corresponding forewarning levels set by a user.

Optionally, the method may further include:
receiving an adding instruction sent by the user;
extracting a feature value of target audio information corresponding to the adding instruction;
constructing a target feature value model based on the feature value of the target audio information; and
adding the target feature value model into the database in association with a corresponding forewarning level included in the adding instruction.

To achieve the above objective, an embodiment of the present application further discloses a server. The server includes: a processor and a memory, wherein, the memory is configured for storing executable program code, and the processor is configured for, by reading the executable program code stored in the memory to execute a program corresponding to the executable program code, performing the steps of:

acquiring audio information;
extracting a feature value of the audio information;
matching the extracted feature value with feature value models in a preset database; wherein, the database stores a correspondence between the feature value models and forewarning levels;
determining a forewarning level corresponding to the audio information based on a matching result;
determining whether the forewarning level meets a preset condition; if the forewarning level meets the preset condition, determining notification information corresponding to the audio information; and
outputting the notification information which is determined.

Optionally, the feature value models include a scene sound model, and the scene sound model is a feature value model constructed for a preset scene sound; the processor is further configured for performing the steps of:
matching the extracted feature value with the scene sound model.

Optionally, the processor is further configured for performing the steps of:
after acquiring the audio information, determining whether the audio information is multi-type audio information; wherein, the multi-type audio information includes multiple types of sounds;
if the audio information is the multi-type audio information, decomposing firstly the multi-type audio information into at least one piece of single-type audio information; wherein, each piece of single-type audio information includes one type of sound; then extracting a feature value of each piece of single-type audio information;
if the audio information is not the multi-type audio information, extracting directly a feature value of single-type audio information;
for each piece of single-type audio information, matching the feature value extracted from the piece of single-type audio information with the feature value models in the preset database;
if the audio information is the single-type audio information,
determining a forewarning level corresponding to the single-type audio information based on the matching result;
if the audio information is the multi-type audio information,
obtaining a matching result corresponding to each piece of single-type audio information included in the multi-type audio information;
determining a weight corresponding to each piece of the single-type audio information; and
determining, based on the determined weights and the matching results, a forewarning level corresponding to the multi-type audio information.

Optionally, the processor is further configured for performing the steps of:
segmenting the multi-type audio information into multiple audio segments based on a preset segmentation rule;
for each of the multiple audio segments:
determining whether the audio segment includes multiple types of sounds;
if the audio segment does not include multiple types of sounds, determining the audio segment as one piece of single-type audio information; and if the audio segment includes multiple types of sounds, decomposing the audio segment into at least one piece of single-type audio information based on a sound parameter in the audio segment; wherein, the sound parameter includes one or more of: tone, loudness, timbre.

Optionally, the processor is further configured for performing the steps of:

in a case that the audio information is determined as the multi-type audio information, matching the multi-type audio information with at least one preset scene sound model;

determining each of scene sounds included in the multi-type audio information based on a matching result;

determining a forewarning level and a weight corresponding to each of the scene sounds;

determining voice information included in the multi-type audio information;

determining each piece of single-type audio information corresponding to the voice information based on the timbre of the voice information;

determining the forewarning level corresponding to the multi-type audio information based on the weight and the matching result corresponding to each piece of single-type audio information and the forewarning level and the weight corresponding to each of the scene sounds.

Optionally, the processor is further configured for performing the steps of:

acquiring a video image and/or geographic location information corresponding to the audio information; and determining the video image and/or the geographic location information as the notification information corresponding to the audio information.

Optionally, the processor is further configured for performing the steps of:

before outputting the notification information which is determined, prompting a user to determine whether to output the notification information;

determining whether rejection information is received from the user within a preset time period; and if no rejection information is received from the user within the preset time period, performing the step of outputting the notification information which is determined.

Optionally, the processor is further configured for performing the steps of:

acquiring analog audio information of abnormal events;

extracting feature values of the analog audio information;

constructing feature value models based on the extracted feature values; and storing the constructed feature value models into the database in association with corresponding forewarning levels set by a user.

Optionally, the processor is further configured for performing the steps of:

receiving an adding instruction sent by the user;

extracting a feature value of target audio information corresponding to the adding instruction;

constructing a target feature value model based on the feature value of the target audio information; and adding the target feature value model into the database in association with a corresponding forewarning level included in the adding instruction.

To achieve the above objective, an embodiment of the present application further discloses a monitoring system. The monitoring system includes a server.

The server is configured for acquiring audio information; extracting a feature value of the audio information; matching the extracted feature value with feature value models in a preset database; wherein, the database stores a correspondence between the feature value models and forewarning levels; determining a forewarning level corresponding to the audio information based on a matching result; determining whether the forewarning level meets a preset condition; if the forewarning level meets the preset condition, determining notification information corresponding to the audio information; and outputting the notification information which is determined.

Optionally, the system further includes an audio capture device.

The audio capture device is configured for capturing the audio information, and sending the captured audio information to the server.

Optionally, the system further includes a video capture device.

The video capture device is configured for capturing a video image, determining geographic location information thereof, and sending the captured video image and the determined geographic location information to the server.

The server is further configured for, during a process of determining notification information corresponding to the audio information, determining a video image and geographic location information corresponding to the audio information, and adding the video image and the geographic location information to the notification information.

Optionally, the server includes: a communication server and a database server; wherein, the database server is configured for acquiring analog audio information of abnormal events; extracting feature values of the analog audio information; constructing feature value models based on the extracted feature values; and storing the constructed feature value models in a database of the database server in association with corresponding forewarning levels set by the user;

the communication server is configured for acquiring audio information; extracting a feature value of the audio information; matching the extracted feature value with feature value models in the database of the database server; wherein, the database stores a correspondence between the feature value models and the forewarning levels; determining a forewarning level corresponding to the audio information based on a matching result; determining whether the forewarning level meets a preset condition; if the forewarning level meets the preset condition, determining notification information corresponding to the audio information; and outputting the notification information which is determined.

To achieve the above objective, an embodiment of the present application further discloses a computer readable storage medium. The computer readable storage medium stores a computer program therein. The computer program, when being executed by a processor, implements any of the above methods for outputting notification information.

To achieve the above objective, an embodiment of the present application further discloses executable program code, and the executable program code is configured for implementing any of the above methods for outputting notification information when being executed.

When applying the embodiments of the present application, a database including a correspondence between feature value models and forewarning levels is constructed in advance; a feature value of the audio information is acquired, the acquired feature value is matched with the feature value models in the database, and then a forewarning level corresponding to the audio information is determined; the notification information is output when the forewarning level meets a preset condition. It can be seen that, in the embodiment of the present application, the notification information is output by analyzing the audio information, without determining the active targets in the video image; even if there are many active targets in the scene and the trajectories of the active targets are confusing, the notification information may still be accurately output by applying this solution.

Of course, any one of the products or methods implementing the present application is not necessarily required to achieve all of the advantages described above at the same time.

BRIEF DESCRIPTION OF THE DRAWINGS

In order to more clearly describe the technical solutions of the embodiments of the present application and the prior art, drawings that need to be used in embodiments and the prior art will be briefly described below. Obviously, drawings described below are for only some of embodiments of the present application; those skilled in the art may also obtain other drawings based on these drawings without any creative efforts.

DETAILED DESCRIPTION

In order to make the objective, technical solutions and advantages of the present application clearer and more understandable, the present application will be described in more detail below with reference to the accompanying drawings and embodiments. Obviously, the described embodiments are only some, and not all, of the embodiments of the present application. All other embodiments obtained based on the embodiments of the present application by those skilled in the art without any creative efforts fall into the scope of protection of the present application.

In order to solve the above technical problem, an embodiment of the present application provides a method for outputting notification information, a server and a monitoring system. The method may be applicable to the server in the monitoring system, or may be applicable to various electronic devices, which is not specifically limited.

The method for outputting notification information provided by the embodiment of the present application is described firstly in detail below.

Figure 1:
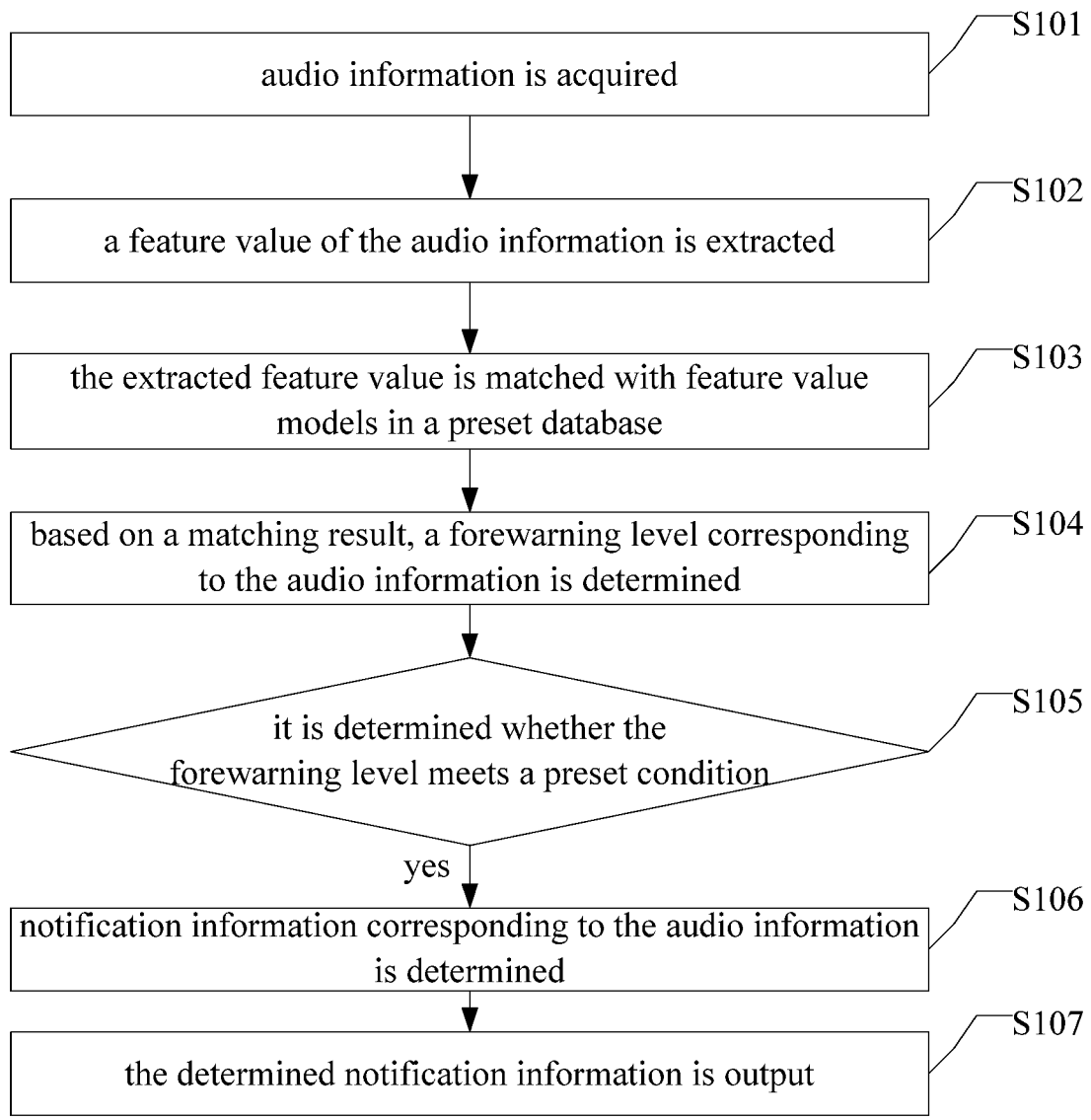
FIG. 1 is a schematic flowchart of a first method for outputting notification information provided by an embodiment of the present application.

FIG. 1 is a schematic flowchart of a method for outputting notification information provided by an embodiment of the present application. The method includes the following steps.

At S101, audio information is acquired.

As an implementation, a device performing the solution (hereinafter referred to as the present device) may have an audio capture function, and the audio information acquired in S101 may be captured by the present device itself.

As another implementation, the present device may be in communication with an audio capture device to acquire the audio information from the audio capture device.

In this embodiment, the solution may be implemented once every preset duration, that is, the audio information is acquired once every preset duration. Alternatively, the solution may be implemented after receiving a trigger instruction from the user, which is not specifically limited.

At S102, a feature value of the audio information is extracted.

In an implementation, the acquired audio information may be filtered, denoised, etc., and then the feature value thereof is extracted.

For example, the extracted feature value may include one or more types of:

a speech rate, semantic information, a volume zero-crossing rate, a maximum volume value, a minimum volume value, an average volume value, a maximum volume change rate, a minimum volume change rate, an average volume change rate, a maximum sound frequency, a minimum sound frequency, an average sound frequency, a maximum sound frequency change rate, a minimum sound frequency change rate, an average sound frequency change rate, an audio curve vector, a volume curve vector, etc.

At S103, the extracted feature value is matched with feature value models in a preset database.

In this embodiment, a database is pre-built before implementing the solution. The database stores a correspondence between the feature value models and forewarning levels, and each feature value model may be a set of multiple feature values.

In the present embodiment, a type of the feature values included in the feature value model is consistent with the type of the feature value extracted in S102. In this way, a better matching effect can be obtained.

For example, it is provided that the forewarning levels include three levels, and the third-level indicates the highest level. In the database, the feature value model corresponding to the first forewarning level may be: the speech rate of 200 words/minute, the average volume value of 70 dB, and the semantic information of "caution". The feature value model corresponding to the second forewarning level may be: the speech rate of 300 words/minute, the average volume value of 80 dB, and the semantic information of "somebody". The feature value model corresponding to the third forewarning level may be: the speech rate of 400 words/minute, the average volume value of 90 dB, and the semantic information of "help".

It should be noted that each forewarning level may correspond to multiple feature value models. For the sake of simplifying the description here, only the above models are taken as examples for description.

At S104, based on the matching result, a forewarning level corresponding to the audio information is determined.

It is assumed that feature values acquired in S102 include: the speech rate of 300 words/minute, the average volume value of 80 dB, and the semantic information of "somebody", these feature values are matched with feature value models in the above database, and the second forewarning level is matched. It is determined that the forewarning level corresponding to the audio information acquired in S101 is the second-level.

It should be noted that, when the extracted feature value is matched with the feature value models in the database, the criteria for successful matching may be set based on actual conditions. For example, it may be provided when a matching rate is higher than a preset value, the matching is successful. The matching result may include information of successfully matching with a certain feature value model or unsuccessfully matching with a certain feature value model, or others, which is not specifically limited.

As an optional implementation, the feature value models stored in the preset database may include a scene sound model, and the scene sound model may be a feature value model constructed for sounds in a preset scene. The scene sounds may include a gunshot sound, a crying sound, a whistling sound, etc., which are not specifically limited. It can be understood that when a disorder occurs in a scene such as a mall, a supermarket or a bank, it is usually accompanied by the gunshot sound, the whistling sound, and the crying sound. In this embodiment, these sounds are referred to as the scene sounds.

Specifically, a machine learning algorithm may be used to perform model training on the scene sounds in advance to obtain the scene sound models. It can be understood that when these scene sounds exist, the probability of occurrence of an abnormal event is large, and therefore, the forewarning levels corresponding to the scene sound models may be set higher.

The feature value extracted in S102 is matched with the scene sound models, and the forewarning level corresponding to a successfully matched scene sound model is determined as the forewarning level of the audio information.

At S105, it is determined whether the forewarning level meets a preset condition, and if the forewarning level meets the preset condition, S106 is performed.

The forewarning level in this step refers to the forewarning level corresponding to the above audio information determined in S104.

At S106, notification information corresponding to the audio information is determined.

Referring to the above examples again, it is assumed that the preset condition is above the first forewarning level, if the preset condition is met, the notification information corresponding to the audio information acquired in S101 is determined.

As an implementation, S106 may include: acquiring a video image and/or geographic location information corresponding to the audio information; and determining the video image and/or the geographic location information as the notification information corresponding to the audio information.

It can be understood that the present device may possess a video capture function and a positioning function, so that the present device may acquire the video image captured by itself and the geographical location information determined by itself; or, the present device may be in communication with another device and acquire the video image and/or the geographic location information corresponding to the audio information from the other device, which are not specifically limited.

The video image corresponding to the audio information refers to a video image that is in the same scene and is at the same capture moment as the audio information; and the geographical location information corresponding to the audio information refers to the geographical location information where the device that captures the audio information is located.

If the present device acquires the video image and/or the geographic location information corresponding to the audio information from another device, the other device and the device that captures the audio information perform the audio or video capture for the same scene.

At S107, the determined notification information is output.

In the above implementation, the notification information includes the video image and/or the geographical location information, so that the abnormal event may be more accurately notified to the relevant person to deal with.

As an implementation, before performing S107, the user may be prompted to determine whether to output the notification information; it is determined whether rejection information sent by the user is received within a preset time period; if no rejection information is received from the user within the preset time period, S107 is performed.

In this implementation, the prompt information may include one or more of: the forewarning level, the video image, the geographic location information corresponding to the audio information, or the like, which is not specifically limited. The prompt information is displayed to the user, and there are multiple display forms, such as pop-up windows, flashing reminders, etc., which are not specifically limited.

It can be understood that for the prompt information, the user may select the confirmation of output, may select the rejection of output, or may select nothing. If the confirmation information sent by the user is received (the user selects the confirmation of output), or the user's feedback is not received within the preset time period (the user selects nothing), step S107 is performed. If the rejection information sent by the user is received (the user selects the rejection of output), the notification information is not output.

As an implementation, the above database is constructed by:

acquiring analog audio information of abnormal events; extracting feature values of the analog audio information; constructing feature value models based on the extracted feature values; and storing the constructed feature value models into the database in association with corresponding forewarning levels set by a user.

The abnormal events may be understood as robbery events, property dispute events, etc., which are not specifically limited.

Those skilled in the art can understand that the above database may be constructed based on actual needs. For example, the analog audio information of the robbery events may be recorded, and the feature values of the analog audio information are extracted. It is assumed that the extracted feature values include: the speech rate of 400 words/minute, the average volume value of 90 dB, and the semantic information of "help"; a feature value model is constructed based on the extracted feature values, and the feature value model may be a set of the above feature values; and, the feature value model is stored in association with a corresponding forewarning level set by the user. In this way, the correspondence between each feature value model and each forewarning level is stored in the database.

As an implementation, the constructed database may be updated by:

receiving an adding instruction sent by the user; extracting a feature value of target audio information corresponding to the adding instruction; constructing a target feature value model based on the feature value of the target audio information; and adding the target feature value model into the database in association with a corresponding forewarning level included in the adding instruction.

It can be understood that, if the user considers that a piece of audio information meets the expectation, for the convenience of description, the audio information that is considered by the user to meet the expectation is referred as the target audio information. The user may send an adding instruction to the device; wherein, the adding instruction may include an identifier of the target audio information and a forewarning level set by the user for the target audio information. After receiving the adding instruction, the device determines the target audio information based on the identifier in the adding instruction, extracts a feature value of the target audio information, constructs a target feature value model based on the extracted feature value, and adds the constructed target feature value model in the database in association with a corresponding forewarning level included in the adding instruction.

It can be seen that, by applying the above implementation, the update of the database is implemented. Further, matching the feature value of the acquired audio information with the feature value models in the updated database may improve the matching accuracy.

When applying the embodiment shown in FIG. 1 of the present application, a database including a correspondence between feature value models and forewarning levels is constructed in advance; a feature value of the audio information is acquired, the acquired feature value is matched with the feature value models in the database, and then a forewarning level corresponding to the audio information is determined; the notification information is output when the forewarning level meets a preset condition. It can be seen that, in the embodiment of the present application, the notification information is output by analyzing the audio information, without determining the active targets in the video image; even if there are many active targets in the scene and the trajectories of the active targets are confusing, the notification information may still be accurately output by applying this solution.

Figure 2:
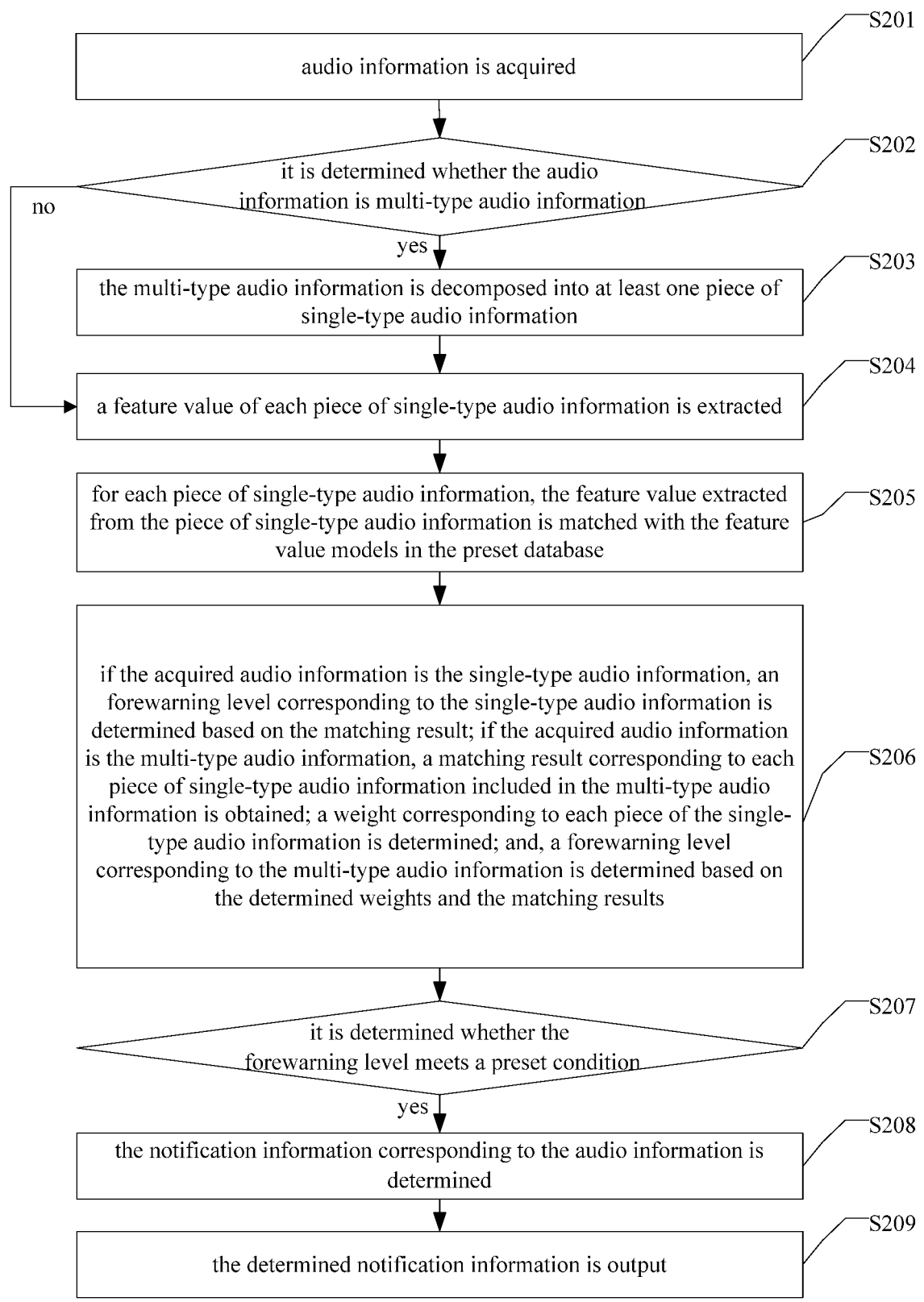
FIG. 2 is a schematic flowchart of a second method for outputting notification information provided by an embodiment of the present application.

FIG. 2 is a schematic flowchart of a second method for outputting notification information provided by an embodiment of the present application. The method includes the following steps.

At S201, audio information is acquired.

At S202, it is determined whether the audio information is multi-type audio information; if the audio information is the multi-type audio information, S203 is performed; if the audio information is not the multi-type audio information, S204 is directly performed.

At S203, the multi-type audio information is decomposed into at least one piece of single-type audio information.

It should be noted that the above multi-type audio information includes multiple types of sounds, and each piece of single-type audio information includes one type of sound.

It can be understood that the application scene of the solution may be a single sound scene, for example, in a home scene; the captured audio information may include voice information of only one person, and such audio information is also the above single-type audio information.

Alternatively, the application scene of the solution may also be a multi-type sound scene, such as a supermarket, a mall, a bank, etc. The captured audio information includes voice information of multiple persons, and such audio information is also the above multi-type audio information.

Alternatively, in the scene, such as a supermarket, a mall, a bank, etc., the captured audio information includes voice information of one person and sound information in the environment, and such audio information is also the multi-type audio information.

Alternatively, in the scene, such as a supermarket, a mall, a bank, etc., the captured audio information includes voice information of multiple persons and sound information in the environment, and such audio information is also the multi-type audio information.

If the audio information acquired in S201 is the multi-type audio information, the multi-type audio information may be firstly decomposed into single-type audio information, and then the subsequent steps are performed.

As an implementation, S203 may include: segmenting the multi-type audio information into multiple audio segments based on a preset segmentation rule; for each of the multiple audio segments, determining whether the audio segment includes multiple types of sounds; if the audio segment does not include multiple types of sounds, determining the audio segment as one piece of single-type audio information; if the audio segment includes multiple types of sounds, decomposing the audio segment into at least one piece of single-type audio information based on a sound parameter in the audio segment; wherein, the sound parameter includes one or more of: tone, loudness, timbre.

There may be multiple preset segmentation rules. For example, the multi-type audio information may be segmented into multiple audio segments each having an equal length of time; or, the multi-type audio information may be segmented into multiple audio segments each having an equal volume size; or, the number of the audio segments to be segmented into may also be determined based on the total duration of the multi-type audio information, and the multi-type audio information may be segmented into audio segments based on this number; or, the number of the audio segments to be segmented into may also be determined based on the total volume size of the multi-type audio information, and the multi-type audio information may be segmented into audio segments based on this number, or the like; the specific segmentation rule is not specifically limited.

For example, the multi-type audio information may be segmented into multiple audio segments each having a duration of 1 second. It is assumed that the total duration of the multi-type audio information is 1 minute, 60 audio segments are obtained.

For each audio segment, it is determined whether the audio segment includes multiple types of sounds. For example, the multi-type audio information is a conversation between a person A and a person B, the duration thereof is one minute, and the voice information of the person A does not intersect with the voice information of the person B. It is assumed that the front 30 audio segments obtained by the segmentation only include the voice information of the person A, and the last 30 audio segments only include the voice information of the person B, each of the 60 audio segments includes only one sound type, and thus is single-type audio information.

This example is ideal, in which exactly each audio segment includes voice information of only one person. In fact, multiple types of sounds would appear in one audio segment. It is still assumed that the multi-type audio information is the conversation between the person A and the person B, and the duration is one minute. However, some of the audio segments obtained by the segmentation include voice information of only one person and some of the audio segments obtained by the segmentation include voice information of two persons. Each of the audio segments including voice information of one person is treated as the single-type audio information; while for each of the audio segments including voice information of two persons, the audio segment is further decomposed based on the sound parameter in the audio segment.

As another example, in some noisy scenes, voice information of multiple persons, which is mixed with the whistling sound and the crying sound, appear at the same moment. Multi-type audio information is captured form these scenes, and the multi-type audio information is segmented to obtain multiple audio segments. Since there are multiple types of sounds at the same moment, the audio segment corresponding to this moment includes multiple types of sounds. The audio segment is further decomposed based on the sound parameter therein.

The sound parameter may include one or more of: pitch, loudness, tone. Those skilled in the art can appreciate that different sounds may be extracted using sound parameter thereof, such as the pitch, the loudness, the tone. Therefore, it is possible to continue to decompose the audio segment including multiple types of sounds to obtain respective pieces of single-type audio information.

In the embodiment shown in FIG. 2, S204 corresponds to S102 in FIG. 1, and S205 corresponds to S103 in FIG. 1, but the steps of extracting the feature value and of matching the feature value in FIG. 2 are performed for each piece of single-type audio information, therefore:

at S204, a feature value of each piece of single-type audio information is extracted;

at S205, for each piece of single-type audio information, the feature value extracted from the piece of single-type audio information is matched with the feature value models in the preset database.

In FIG. 2, S206 corresponds to S104 in FIG. 1, and at S206, if the audio information acquired in S201 is the single-type audio information, a forewarning level corresponding to the single-type audio information is determined based on the matching result;

if the audio information acquired in S201 is the multi-type audio information, a matching result corresponding to each piece of single-type audio information included in the multi-type audio information is obtained; a weight corresponding to each piece of the single-type audio information is determined; and, a forewarning level corresponding to the multi-type audio information is determined based on the determined weights and the matching results.

It can be understood that, if the audio information is multi-type audio information, after performing S205, each piece of single-type audio information included in the multi-type audio information corresponds to a matching result, and in this case, the weight corresponding to each piece of single-type audio information may be determined. There are multiple specific manners. For example, the weight is determined based on the order of the pieces of single-type audio information obtained by the decomposition; or the weight is determined based on the average volume value of each piece of single-type audio information, or the like, which is not specifically limited.

For example, it is assumed that the multi-type audio information acquired in S201 includes the whistling sound, the crying sound, and the voice information of the multiple persons; the multi-type audio information is decomposed to obtain four pieces of single-type audio information of the "whistling sound", the "crying sound", the "voice information of the person A" and the "voice information of the person B".

It is assumed that the "whistling sound" successfully match a feature value model corresponding to the second forewarning level in the database, that is, based on the matching result corresponding to the "whistling sound", the forewarning level is determined as the second-level. In addition, it is assumed that based on the matching result of the "crying sound", the forewarning level is determined as the third-level; based on the matching result corresponding to the "voice information of the person A", the forewarning level is determined as the third-level; and based on the matching result corresponding to the "voice information of the person B", the forewarning level is determined as the first-level.

It is assumed that the weight corresponding to the "whistling sound" is 0.7, the weight corresponding to the "crying sound" is 0.9, the weight corresponding to the "voice information of the person A" is 0.8, and the weight corresponding to the "voice information of the person B" is 0.6, then it is determined that the forewarning level corresponding to the multi-type audio information is (0.7*2+0.9*3+0.8*3+0.6*1)/4=1.775. It can be considered that the forewarning level is greater than the first-level and less than the second-level, or the forewarning level may also be directly approximately equal to the second-level, which is not specifically limited.

Alternatively, the weights and forewarning levels corresponding to the scene sounds, such as the "whistling sound", the "crying sound", may be set higher. As an implementation, if single-type audio information corresponding to the scene sounds and other single-type audio information (for example, the voice information of a person) is obtained after decomposing the multi-type audio information acquired in S201, it is also reasonable to calculate the forewarning level corresponding to the multi-type audio information by only considering forewarning levels and weights corresponding to the scene sounds.

In FIG. 2, S207 is the same as S105 in FIG. 1, S208 is the same as S106 in FIG. 1, and S209 is the same as S107 in FIG. 1.

If the determined forewarning level meets the preset condition, the notification information corresponding to the multi-type audio information is determined, and the subsequent steps are similar to the embodiment of FIG. 1 and will not be described again.

When applying the embodiment shown in FIG. 2 of the present application, in a multi-type sound scene, the multi-types audio information is acquired, the multi-type audio information is decomposed into single-type audio information, and then the single-type audio information is analyzed to output the notification information, thereby further improving the accuracy of outputting the notification information.

Figure 3:
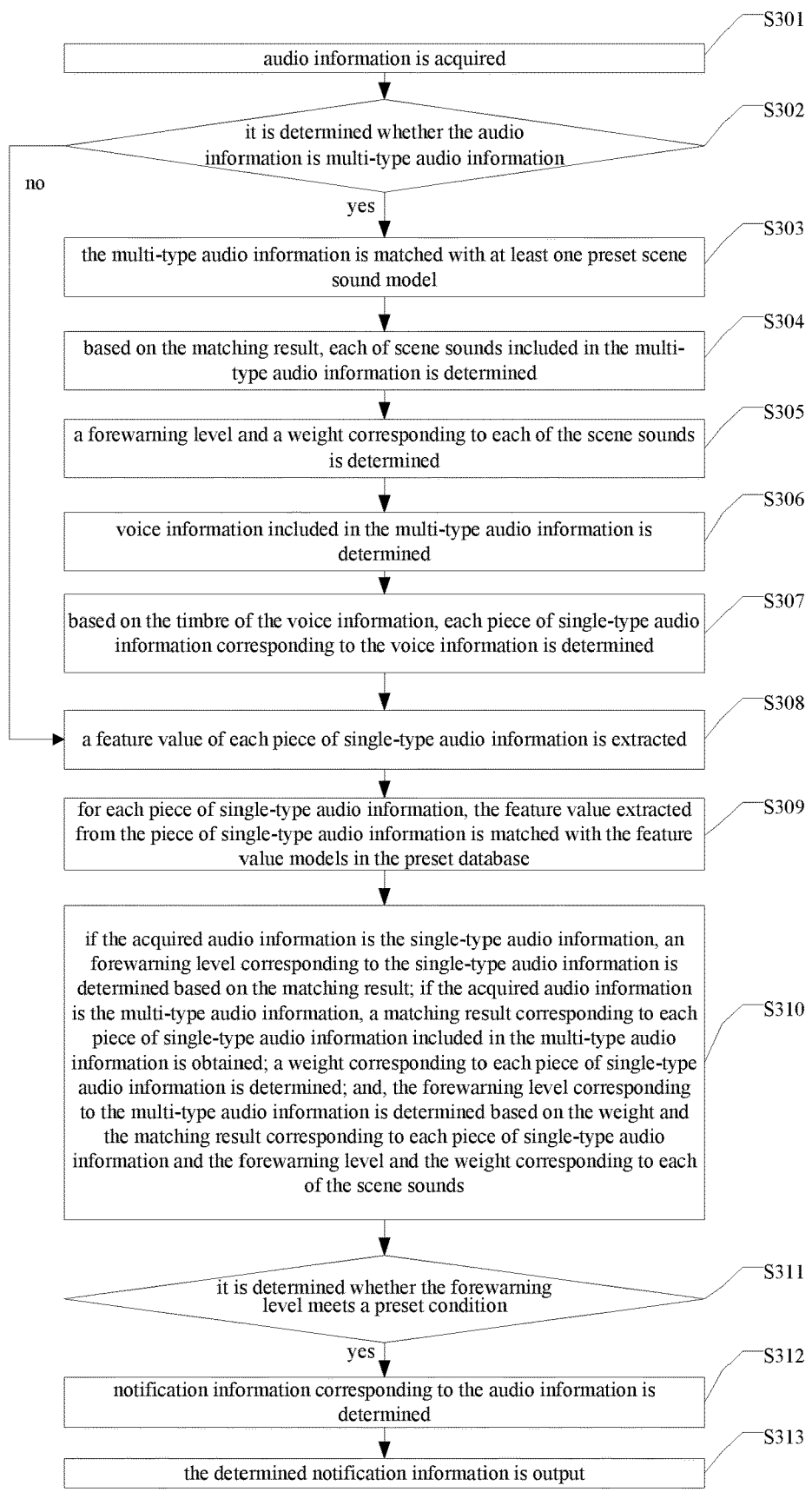
FIG. 3 is a schematic flowchart of a third method for outputting notification information provided by an embodiment of the present application.

FIG. 3 is a schematic flowchart of a third method for outputting notification information provided by an embodiment of the present application. The method includes the following steps.

At S301, audio information is acquired.

At S302, it is determined whether the audio information is multi-type audio information; if the audio information is the multi-type audio information, S303 is performed; if the audio information is not the multi-type audio information, S308 is directly performed.

At S303, the multi-type audio information is matched with at least one preset scene sound model.

At S304, based on a matching result, each of scene sounds included in the multi-type audio information is determined.

At S305, a forewarning level and a weight corresponding to each of the scene sounds is determined.

The scene sound model may include: a gunshot sound model, a whistling sound model, a crying sound model, and the like, which is not specifically limited in detail. It can be understood that when a disorder occurs in a scene such as a mall, a supermarket or a bank, it is usually accompanied by the gunshot sound, the whistling sound, and the crying sound. In the embodiment in FIG. 3, these sounds are referred to as the scene sounds.

A machine learning algorithm may be used to perform model training on the scene sounds in advance to obtain the scene sound models. Before decomposing the multi-type audio information, the multi-type audio information may be firstly matched with these scene sound models.

For example, it is assumed that the multi-type audio information acquired in S301 includes the whistling sound, the crying sound, and the voice information of multiple persons. The multi-type audio information is firstly matched with each of preset scene sound models, and it is assumed that the matching result is: successfully matching with the whistling sound model and the crying sound model, that is, it is determined that the multi-type audio information includes the whistling sound and the crying sound.

As an implementation, a corresponding forewarning level and a corresponding weight may be set in advance for each of the scene sounds. The set forewarning levels and weights may be stored correspondingly with the scene sound models, so that based on the matching result in S303, a forewarning level and a weight corresponding to each of the scene sounds (the whistling sound and the crying sound) may be directly determined.

As another implementation, S305 may include: extracting each of the scene sounds from the multi-type audio information; for each of the extracted scene sounds, extracting a feature value of the scene sound; matching the extracted feature value with the feature value models in the preset database; determining a forewarning level corresponding to a successfully matched feature value model as a forewarning level corresponding to the scene sound.

Referring to the above example, the multi-type audio information includes the whistling sound and the crying sound. The whistling sound and the crying sound may be extracted respectively based on the tone, the loudness, the timbre or other sound parameters. In this embodiment, the scene sound is also handled as the single-type audio information. Specifically, feature values of the whistling sound and the crying sound are extracted and matched, and the specific processes are similar to S204 and S205 in the embodiment of FIG. 2, which are not described herein again.

The database in this implementation and the database in the embodiment of FIG. 1 may be the same database, or may be different databases, which are not specifically limited.

In the embodiment shown in FIG. 3, the scene sounds and the voice information in the multi-type audio information are separately processed. The scene sounds may be processed firstly, and then the voice information is processed; or, the voice information may be also processed firstly, and then the scene sounds may be processed. That is to say, S303-S305 may be performed firstly, and then S306-S309 are performed; or, S306-S309 may be performed firstly, and then S303-S305 are performed. The specific order is not limited.

The voice information in this embodiment refers to "a voice that is made by a person and has semantics", and does not include a voice having no semantics, such as the above crying sound.

At S306, voice information included in the multi-type audio information is determined.

At S307, based on the timbre of the voice information, each piece of single-type audio information corresponding to the voice information is determined.

Those skilled in the art can understand that the voice information made by a person may be extracted through the timbre, or may be extracted by other manners, which is not specifically limited.

Then, a feature value of each piece of single-type audio information corresponding to the voice information is extracted (S308) and matched (S309). In FIG. 3, S308 corresponds to S204 in FIG. 2, and S309 corresponds to S205 in FIG. 2. The specific process is not described again.

At S310, if the audio information acquired in S301 is the single-type audio information, a forewarning level corresponding to the single-type audio information is determined based on the matching result;

if the audio information acquired in S301 is the multi-type audio information, a matching result corresponding to each piece of single-type audio information included in the multi-type audio information is obtained; a weight corresponding to each piece of single-type audio information is determined; and, the forewarning level corresponding to the multi-type audio information is determined, based on the weight and the matching result corresponding to each piece of single-type audio information, and the forewarning level and the weight corresponding to each of the scene sounds.

It can be understood that, if the audio information is multi-type audio information, after performing S309, each piece of single-type audio information included in the multi-type audio information corresponds to a matching result, and in this case, the weight corresponding to each piece of single-type audio information may be determined. There are multiple specific manners. For example, the weight is determined based on the order of the pieces of single-type audio information obtained by the decomposition; or, the weight is randomly assigned; or, the weight is determined based on the average volume value of each piece of single-type audio information, or the like, which is not specifically limited.

The forewarning level and weight determined in S305, and the matching result and weight corresponding to the single-type audio information are comprehensively considered to determine the forewarning level corresponding to the multi-type audio information. That is to say, the forewarning level and weight corresponding to each of the scene sounds, and the forewarning level and weight corresponding to each piece of single-type audio information are comprehensively considered, to determine the forewarning level corresponding to the multi-type audio information.

It is assumed that the multi-type audio information acquired in S301 includes two scene sounds of the whistling sound and the crying sound, and voice information of person A and person B. The multi-type audio information is firstly matched with the scene sound models, to determine that the multi-type audio information includes the "whistling sound" and the "crying sound"; then, it is determined that the voice information included in the multi-type audio information corresponds to two pieces of single-type audio information, the "voice information of the person A" and the "voice information of the person B".

Alternatively, it may firstly be determined that the voice information included in the multi-type audio information corresponds to two pieces of single-type audio information, the "voice information of the person A" and the "voice information of the person B"; then, the multi-type audio information is matched with the scene sound models, to determine that the multi-type audio information includes the "whistling sound" and the "crying sound".

It is assumed that, by S305, the forewarning level and the weight corresponding to the "whistling sound" is determined as the second-level and 0.7 respectively, and the forewarning level and the weight corresponding to the "crying sound" is determined as the third-level and 0.9 respectively; by S306-S309, the forewarning level and the weight corresponding to the "voice information of the person A" is determined as the third-level and 0.8 respectively, and the forewarning level and the weight corresponding to the "voice information of the person B" is determined as the first-level and 0.6 respectively.

Step S310 is performed to determine that the forewarning level corresponding to the multi-type audio information is $(0.7*2+0.9*3+0.8*3+0.6*1)/4=1.775$. It can be considered that the forewarning level is greater than the first-level and less than the second-level, or the forewarning level may also be directly approximately equal to the second-level, which is not specifically limited.

In FIG. 3, S311 is the same as S105 in FIG. 1, S312 is the same as S106 in FIG. 1, and S313 is the same as S107 in FIG. 1.

If the determined forewarning level meets the preset condition, the notification information corresponding to the multi-type audio information is determined, and the subsequent steps are similar to the embodiment of FIG. 1 and will not be described again.

When applying the embodiment shown in FIG. 3 of the present application, in a multi-type sound scene, the multi-type audio information is acquired, and scene sounds and voice information in the multi-type audio information are processed separately, such that the scene sounds and the voice information can be distinguished based on the difference therebetween.

Corresponding to the above embodiments of the method, an embodiment of the present application further provides a server.

Figure 4:
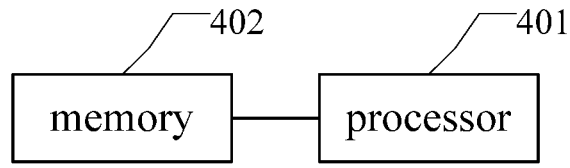
FIG. 4 is a schematic structural diagram of a server provided by an embodiment of the present application.

FIG. 4 is a schematic structural diagram of a server provided by an embodiment of the present application. The server includes: a processor 401 and a memory 402. The memory 402 is configured for storing executable program code, and the processor 402 is configured for, by reading the executable program code stored in the memory 402 to execute a program corresponding to the executable program code, performing the steps of:

acquiring audio information;

extracting a feature value of the audio information;

matching the extracted feature value with feature value models in a preset database; wherein, the database stores a correspondence between the feature value models and forewarning levels;

determining a forewarning level corresponding to the audio information based on a matching result;

determining whether the forewarning level meets a preset condition; if the forewarning level meets the preset condition, determining notification information corresponding to the audio information; and outputting the notification information which is determined.

As an implementation, the feature value models include a scene sound model, and the scene sound model is a feature value model constructed for a preset scene sound; the processor 401 may be further configured for performing the steps of:

matching the extracted feature value with the scene sound model.

As an implementation, the processor 401 may be further configured for performing the steps of:

after acquiring the audio information, determining whether the audio information is multi-type audio information; wherein, the multi-type audio information includes multiple types of sounds;

if the audio information is the multi-type audio information, decomposing firstly the multi-type audio information into at least one piece of single-type audio information; wherein, each piece of single-type audio information includes one type of sound; then extracting a feature value of each piece of single-type audio information;

if the audio information is not the multi-type audio information, extracting directly a feature value of the single-type audio information;

for each piece of single-type audio information, matching the feature value extracted from the piece of single-type audio information with the feature value models in the preset database;

if the audio information is the single-type audio information, determining a forewarning level corresponding to the single-type audio information based on the matching result;

if the audio information is the multi-type audio information, obtaining a matching result corresponding to each piece of single-type audio information included in the multi-type audio information;

determining a weight corresponding to each piece of the single-type audio information; and determining, based on the determined weights and the matching results, a forewarning level corresponding to the multi-type audio information.

As an implementation, the processor 401 may be further configured for performing the steps of:

segmenting the multi-type audio information into multiple audio segments based on a preset segmentation rule;

for each of the multiple audio segments, determining whether the audio segment includes multiple types of sounds;

if the audio segment does not include multiple types of sounds, determining the audio segment as one piece of single-type audio information; and if the audio segment includes multiple types of sounds, decomposing the audio segment into at least one piece of single-type audio information based on a sound parameter in the audio segment; wherein, the sound parameter includes one or more of: tone, loudness, timbre.

As an implementation, the processor 401 may be further configured for performing the steps of:

in a case that the audio information is determined as the multi-type audio information, matching the multi-type audio information with at least one preset scene sound model;

determining each of scene sounds included in the multi-type audio information based on a matching result;

determining a forewarning level and a weight corresponding to each of the scene sounds;

determining voice information included in the multi-type audio information;

determining each piece of single-type audio information corresponding to the voice information based on the timbre of the voice information;

determining the forewarning level corresponding to the multi-type audio information, based on the weight and the matching result corresponding to each piece of single-type audio information, and the forewarning level and the weight corresponding to each of the scene sounds.

As an implementation, the processor 401 may be further configured for performing the steps of:

extracting each of the scene sounds from the multi-type audio information;

for each of the extracted scene sounds, extracting a feature value of the scene sound; matching the extracted feature value with the feature value models in the preset database; determining a forewarning level corresponding to a successfully matched feature value model as a forewarning level corresponding to the scene sound.

As an implementation, the processor 401 may be further configured for performing the steps of:

acquiring a video image and/or geographic location information corresponding to the audio information; and determining the video image and/or the geographic location information as the notification information corresponding to the audio information.

As an implementation, the processor 401 may be further configured for performing the steps of:

before outputting the notification information which is determined, prompting a user to determine whether to output the notification information;

determining whether rejection information is received from the user within a preset time period; and if no rejection information is received from the user within the preset time period, performing the step of outputting the notification information which is determined.

As an implementation, the processor 401 may be further configured for performing the steps of:

acquiring analog audio information of abnormal events;

extracting feature values of the analog audio information;

constructing feature value models based on the extracted feature values; and storing the constructed feature value models into the database in association with corresponding forewarning levels set by a user.

As an implementation, the processor 401 may be further configured for performing the steps of:

receiving an adding instruction sent by the user;

extracting a feature value of target audio information corresponding to the adding instruction;

constructing a target feature value model based on the feature value of the target audio information; and adding the target feature value model into the database in association with a corresponding forewarning level included in the adding instruction.

When applying the embodiment shown in FIG. 4 of the present application, a database including a correspondence between feature value models and forewarning levels is constructed in advance; a feature value of the audio information is acquired, the acquired feature value is matched with the feature value models in the database, and then a forewarning level corresponding to the audio information is determined; the notification information is output when the forewarning level meets a preset condition. It can be seen that, in the embodiment of the present application, the notification information is output by analyzing the audio information, without determining the active targets in the video image; even if there are many active targets in the scene and the trajectories of the active targets are confusing, the notification information may still be accurately output by applying this solution.

An embodiment of the present application further provides a monitoring system. The monitoring system may include only a server which has an audio capture function; or, the monitoring system may also include, as shown in FIG. 5, a server and an audio capture device; or, the monitoring system may also include, as shown in FIG. 6, a server and a multimedia capture device which has an audio and video capture function; or, the monitoring system may also include, as shown in FIG. 7, a server, an audio capture device and a video capture device.

Figure 5:
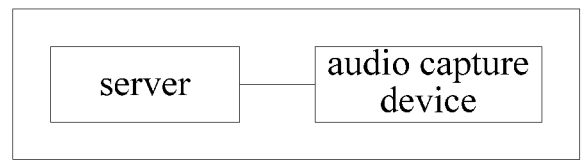
FIG. 5 is a schematic structural diagram of a first monitoring system provided by an embodiment of the present application.
Figure 6:
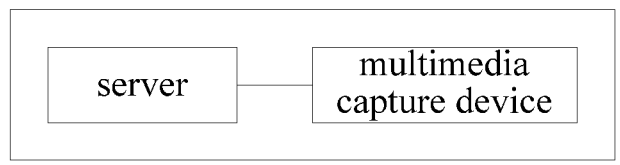
FIG. 6 is a schematic structural diagram of a second monitoring system provided by an embodiment of the present application.
Figure 7:
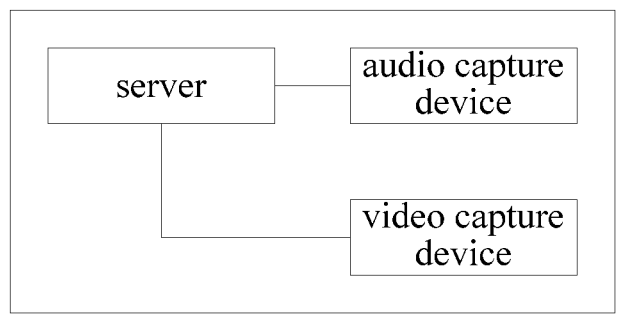
FIG. 7 is a schematic structural diagram of a third monitoring system provided by an embodiment of the present application.

In the embodiment shown in FIG. 5, FIG. 6 or FIG. 7, the audio capture device or the multimedia capture device is configured for capturing audio information and sending the captured audio information to the server.

In the embodiment shown in FIG. 6 or FIG. 7, the video capture device or the multimedia capture device is configured for capturing a video image, determining its geographic location information, and sending the captured video image and the determined geographic location information to the server.

The server is further configured for, during a process of determining notification information corresponding to the audio information, determining a video image and geographic location information corresponding to the audio information, and adding the video image and the geographic location information to the notification information.

As an implementation, the server may include a communication server and a database server; wherein, the database server is configured for acquiring analog audio information of abnormal events; extracting feature values of the analog audio information; constructing feature value models based on the extracted feature values; and storing the constructed feature value models in a database of the database server in association with corresponding forewarning levels set by the user;

the communication server is configured for acquiring audio information; extracting a feature value of the audio information; matching the extracted feature value with feature value models in the database of the database server; wherein, the database stores a correspondence between the feature value models and forewarning levels; determining a forewarning level corresponding to the audio information based on a matching result; determining whether the forewarning level meets a preset condition; if the forewarning level meets the preset condition, determining notification information corresponding to the audio information; and outputting the notification information which is determined.

In the monitoring system provided by the embodiment of the present application, the server may be configured for:

acquiring audio information; extracting a feature value of the audio information; matching the extracted feature value with feature value models in a preset database; wherein, the database stores a correspondence between the feature value models and forewarning levels; determining a forewarning level corresponding to the audio information based on a matching result; determining whether the forewarning level meets a preset condition; if the forewarning level meets the preset condition, determining notification information corresponding to the audio information; and outputting the notification information which is determined.

As an implementation, the feature value models include a scene sound model, and the scene sound model is a feature value model constructed for a preset scene sound; the server may be further configured for:

matching the extracted feature value with the scene sound model.

As an implementation, the server may be further configured for:

after acquiring the audio information, determining whether the audio information is multi-type audio information; wherein, the multi-type audio information includes multiple types of sounds; if the audio information is the multi-type audio information, decomposing firstly the multi-type audio information into at least one piece of single-type audio information; wherein, each piece of single-type audio information includes one type of sound; then extracting a feature value of each piece of single-type audio information; if the audio information is not the multi-type audio information, extracting directly a feature value of the single-type audio information; for each piece of single-type audio information, matching the feature value extracted from the piece of single-type audio information with the feature value models in the preset database; if the audio information is the single-type audio information, determining a forewarning level corresponding to the single-type audio information based on the matching result; if the audio information is the multi-type audio information, obtaining a matching result corresponding to each piece of single-type audio information included in the multi-type audio information; determining a weight corresponding to each piece of the single-type audio information; and determining, based on the determined weights and the matching results, a forewarning level corresponding to the multi-type audio information.

As an implementation, the server may be further configured for:

segmenting the multi-type audio information into multiple audio segments based on a preset segmentation rule;

for each of the multiple audio segments, determining whether the audio segment includes multiple types of sounds;

if the audio segment does not include multiple types of sounds, determining the audio segment as one piece of single-type audio information; and if the audio segment includes multiple types of sounds, decomposing the audio segment into at least one piece of single-type audio information based on a sound parameter in the audio segment; wherein, the sound parameter includes one or more of: tone, loudness, timbre.

As an implementation, the server may be further configured for:

in a case that the audio information is determined as the multi-type audio information, matching the multi-type audio information with at least one preset scene sound model;

determining each of scene sounds included in the multi-type audio information based on a matching result;

determining a forewarning level and a weight corresponding to each of the scene sounds;

determining voice information included in the multi-type audio information;

determining each piece of single-type audio information corresponding to the voice information based on the timbre of the voice information;

determining the forewarning level corresponding to the multi-type audio information, based on the weight and the matching result corresponding to each piece of single-type audio information, and the forewarning level and the weight corresponding to each of the scene sounds.

As an implementation, the server may be further configured for:

extracting each of the scene sounds from the multi-type audio information;

for each of the extracted scene sounds, extracting a feature value of the scene sound; matching the extracted feature value with the feature value models in the preset database; determining a forewarning level corresponding to a successfully matched feature value model as a forewarning level corresponding to the scene sound.

As an implementation, the server may be further configured for:

acquiring a video image and/or geographic location information corresponding to the audio information; and determining the video image and/or the geographic location information as the notification information corresponding to the audio information.

As an implementation, the server may be further configured for:

prompting a user to determine whether to output the notification information; determining whether rejection information is received from the user within a preset time period; and if no rejection information is received from the user within the preset time period, performing the step of outputting the notification information which is determined.

As an implementation, the process of the server constructing the database may include:

acquiring analog audio information of abnormal events;

extracting feature values of the analog audio information;

constructing feature value models based on the extracted feature values; and storing the constructed feature value models into the database in association with corresponding forewarning levels set by a user.

As an implementation, the server may be further configured for:

receiving an adding instruction sent by the user;

extracting a feature value of target audio information corresponding to the adding instruction;

constructing a target feature value model based on the feature value of the target audio information; and adding the target feature value model into the database in association with a corresponding forewarning level included in the adding instruction.

When applying the embodiments of the present application, a database including a correspondence between feature value models and forewarning levels is constructed in advance; a feature value of the audio information is acquired, the acquired feature value is matched with the feature value models in the database, and then a forewarning level corresponding to the audio information is determined; the notification information is output when the forewarning level meets a preset condition. It can be seen that, in the embodiment of the present application, the notification information is output by analyzing the audio information, without determining the active targets in the video image; even if there are many active targets in the scene and the trajectories of the active targets are confusing, the notification information may still be accurately output by applying this solution.

An embodiment of the present application further provides a computer readable storage medium. The computer readable storage medium stores a computer program therein. The computer program, when being executed by a processor, implements any of the above methods for outputting notification information.

An embodiment of the present application further provides executable program code. The executable program code is configured for, when being executed, implementing any of the above methods for outputting notification information.

It should be noted that the relationship terms used herein, such as "first", "second" and the like are only to distinguish one entity or operation from another entity or operation, but do not necessarily require or imply that there is an actual relationship or order between these entities or operations. Moreover, the terms "include", "comprise", or any other variants thereof are intended to cover a non-exclusive inclusion, such that processes, methods, articles or devices, including a series of elements, include not only those elements that have been listed, but also other elements that are not specifically listed or the elements intrinsic to these processes, methods, articles or devices. Without further limitations, elements limited by the wording "include(s) a/an . . . " or "comprise(s) a/an . . . " do not exclude additional identical elements in the processes, methods, articles or devices, including the listed elements.

All of the embodiments in the description are described in a correlated manner, and identical or similar parts in various embodiments can refer to one another. In addition, the description for each embodiment focuses on the differences from other embodiments. In particular, the embodiment of the server shown in FIG. 4 and the embodiment of the monitoring system shown in FIGS. 5-7 are described briefly, since they are substantially similar to the embodiment of the method for outputting notification information shown in FIGS. 1-3, and the related contents can refer to the description of the embodiment of the method for outputting notification information shown in FIGS. 1-3.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A method for outputting notification information, comprising:
   acquiring audio information;
   after acquiring the audio information, determining whether the audio information is multi-type audio information; wherein, the multi-type audio information comprises multiple types of sounds;
   if the audio information is the multi-type audio information, decomposing firstly the multi-type audio information into at least one piece of single-type audio information, wherein each piece of single-type audio information comprises one type of sound; and extracting a feature value of the audio information; if the audio information is not the multi-type audio information, extracting a feature value of the audio information;
   matching the extracted feature value with feature value models in a preset database; wherein, the database stores a correspondence between the feature value models and forewarning levels;
   determining a forewarning level corresponding to the audio information based on a matching result;
   determining whether the forewarning level meets a preset condition; if the forewarning level meets the preset condition, determining notification information corresponding to the audio information; and
   outputting the notification information which is determined.

2. The method of claim 1, wherein, the feature value models comprise a scene sound model, and the scene sound model is a feature value model constructed for a preset scene sound;
   wherein matching the extracted feature value with feature value models in a preset database, comprises:
   matching the extracted feature value with the scene sound model.

3. The method of claim 1,
wherein extracting a feature value of the audio information, comprises:
   extracting a feature value of each piece of single-type audio information;
   wherein matching the extracted feature value with feature value models in a preset database, comprises:
   for each piece of single-type audio information, matching the feature value extracted from the piece of single-type audio information with the feature value models in the preset database;
   wherein determining a forewarning level corresponding to the audio information based on a matching result, comprises:
   if the audio information is the single-type audio information,
   determining a forewarning level corresponding to the single-type audio information based on the matching result;
   if the audio information is the multi-type audio information,
   obtaining a matching result corresponding to each piece of single-type audio information comprised in the multi-type audio information;
   determining a weight corresponding to each piece of the single-type audio information; and
   determining, based on the determined weights and the matching results, a forewarning level corresponding to the multi-type audio information.

4. The method of claim 3, wherein, in a case that the audio information is determined as the multi-type audio information, the method further comprises:
   matching the multi-type audio information with at least one preset scene sound model;
   determining each of scene sounds comprised in the multi-type audio information based on a matching result;
   determining a forewarning level and a weight corresponding to each of the scene sounds;
   wherein decomposing the multi-type audio information into at least one piece of single-type audio information, comprises:
   determining voice information comprised in the multi-type audio information;
   determining each piece of single-type audio information corresponding to the voice information based on timbre of the voice information;
   wherein determining, based on the determined weights and the matching results, a forewarning level corresponding to the multi-type audio information, comprises:
   determining the forewarning level corresponding to the multi-type audio information based on the weight and the matching result corresponding to each piece of single-type audio information and the forewarning level and the weight corresponding to each of the scene sounds.

5. The method of claim 1, wherein, decomposing the multi-type audio information into at least one piece of single-type audio information, comprises:
   segmenting the multi-type audio information into multiple audio segments based on a preset segmentation rule;
   for each of the multiple audio segments:
   determining whether the audio segment comprises multiple types of sounds;
   if the audio segment does not comprise multiple types of sounds, determining the audio segment as one piece of single-type audio information;
   if the audio segment comprises multiple types of sounds, decomposing the audio segment into at least one piece of single-type audio information based on a sound parameter in the audio segment; wherein, the sound parameter comprises one or more of: tone, loudness, timbre.

6. The method of claim 1, wherein, determining notification information corresponding to the audio information, comprises:
acquiring a video image and/or geographic location information corresponding to the audio information; and
determining the video image and/or the geographic location information as the notification information corresponding to the audio information.

7. The method of claim 1, wherein, before outputting the notification information which is determined, the method further comprises:
prompting a user to determine whether to output the notification information;
determining whether rejection information is received from the user within a preset time period; and
if no rejection information is received from the user within the preset time period, performing the step of outputting the notification information which is determined.

8. The method of claim 1, wherein, the database is constructed by:
acquiring analog audio information of abnormal events;
extracting feature values of the analog audio information;
constructing feature value models based on the extracted feature values; and
storing the constructed feature value models into the database in association with corresponding forewarning levels set by a user.

9. The method of claim 1, wherein, the method further comprises:
receiving an adding instruction sent by a user;
extracting a feature value of target audio information corresponding to the adding instruction;
constructing a target feature value model based on the feature value of the target audio information; and
adding the target feature value model into the database in association with a corresponding forewarning level comprised in the adding instruction.

10. A non-transitory computer readable storage medium, storing a computer program; wherein, the computer program implements the method for outputting notification information of claim 1 when being executed by a processor.

11. A server, comprising: a processor and a memory; wherein, the memory is configured for storing executable program code, and the processor is configured for, by reading the executable program code stored in the memory to execute a program corresponding to the executable program code, performing steps of:
acquiring audio information;
after acquiring the audio information, determining whether the audio information is multi-type audio information; wherein, the multi-type audio information comprises multiple types of sounds;
if the audio information is the multi-type audio information, decomposing firstly the multi-type audio information into at least one piece of single-type audio information, wherein each piece of single-type audio information comprises one type of sound, and extracting a feature value of each piece of single-type audio information; if the audio information is not the multi-type audio information, extracting directly a feature value of single-type audio information;
matching the extracted feature value with feature value models in a preset database; wherein, the database stores a correspondence between the feature value models and forewarning levels;
determining a forewarning level corresponding to the audio information based on a matching result;
determining whether the forewarning level meets a preset condition; if the forewarning level meets the preset condition, determining notification information corresponding to the audio information; and
outputting the notification information which is determined.

12. The server of claim 11, wherein, the feature value models comprise a scene sound model, and the scene sound model is a feature value model constructed for a preset scene sound; the processor is further configured for performing a step of:
matching the extracted feature value with the scene sound model.

13. The server of claim 11, wherein, the processor is further configured for performing steps of:
for each piece of single-type audio information, matching the feature value extracted from the piece of single-type audio information with the feature value models in the preset database;
if the audio information is the single-type audio information, determining a forewarning level corresponding to the single-type audio information based on the matching result;
if the audio information is the multi-type audio information,
obtaining a matching result corresponding to each piece of single-type audio information comprised in the multi-type audio information;
determining a weight corresponding to each piece of the single-type audio information; and
determining, based on the determined weights and the matching results, a forewarning level corresponding to the multi-type audio information.

14. The server of claim 13, wherein, the processor is further configured for performing steps of:
in a case that the audio information is determined as the multi-type audio information, matching the multi-type audio information with at least one preset scene sound model;
determining each of scene sounds comprised in the multi-type audio information based on a matching result;
determining a forewarning level and a weight corresponding to each of the scene sounds;
determining voice information comprised in the multi-type audio information;
determining each piece of single-type audio information corresponding to the voice information based on timbre of the voice information;
determining the forewarning level corresponding to the multi-type audio information based on the weight and the matching result corresponding to each piece of single-type audio information and the forewarning level and the weight corresponding to each of the scene sounds.

15. The server of claim 11, wherein, the processor is further configured for performing steps of:
segmenting the multi-type audio information into multiple audio segments based on a preset segmentation rule;
for each of the multiple audio segments:
determining whether the audio segment comprises multiple types of sounds;

if the audio segment does not comprise multiple types of sounds, determining the audio segment as one piece of single-type audio information;

if the audio segment comprises multiple types of sounds, decomposing the audio segment into at least one piece of single-type audio information based on a sound parameter in the audio segment; wherein the sound parameter comprises one or more of: tone, loudness, timbre.

16. The server of claim 11, wherein, the processor is further configured for performing steps of:

acquiring a video image and/or geographic location information corresponding to the audio information; and determining the video image and/or the geographic location information as the notification information corresponding to the audio information; and/or wherein, the processor is further configured for performing steps of:

before outputting the notification information which is determined, prompting a user to determine whether to output the notification information;

determining whether rejection information is received from the user within a preset time period; and if no rejection information is received from the user within the preset time period, performing the step of outputting the notification information which is determined.

17. The server of claim 11, wherein, the processor is further configured for performing steps of:

acquiring analog audio information of abnormal events;

extracting feature values of the analog audio information;

constructing feature value models based on the extracted feature values; and storing the constructed feature value models into the database in association with corresponding forewarning levels set by a user; and/or wherein, the processor is further configured for performing steps of:

receiving an adding instruction sent by a user;

extracting a feature value of target audio information corresponding to the adding instruction;

constructing a target feature value model based on the feature value of the target audio information; and adding the target feature value model into the database in association with a corresponding forewarning level comprised in the adding instruction.

18. A monitoring system, comprising a server, wherein the server is configured for:

acquiring audio information;

after acquiring the audio information, determining whether the audio information is multi-type audio information, wherein the multi-type audio information comprises multiple types of sounds;

if the audio information is the multi-type audio information, decomposing firstly the multi-type audio information into at least one piece of single-type audio information, wherein each piece of single-type audio information comprises one type of sound, and extracting a feature value of the audio information; if the audio information is not the multi-type audio information, extracting a feature value of the audio information;

matching the extracted feature value with feature value models in a preset database, wherein, the database stores a correspondence between the feature value models and forewarning levels;

determining a forewarning level corresponding to the audio information based on a matching result;

determining whether the forewarning level meets a preset condition; if the forewarning level meets the preset condition, determining notification information corresponding to the audio information; and outputting the notification information which is determined.

19. The system of claim 18, wherein, the system further comprises: an audio capture device;

the audio capture device is configured for capturing the audio information, and sending the captured audio information to the server; and/or wherein, the system further comprises: a video capture device;

the video capture device is configured for capturing a video image, determining geographic location information thereof, and sending the captured video image and the determined geographic location information to the server;

the server is further configured for, during a process of determining the notification information corresponding to the audio information, determining a video image and geographic location information corresponding to the audio information, and adding the video image and the geographic location information to the notification information.

20. The system of claim 18, wherein, the server comprises: a communication server and a database server;

the database server is configured for acquiring analog audio information of abnormal events; extracting feature values of the analog audio information; constructing feature value models based on the extracted feature values; and storing the constructed feature value models with corresponding forewarning levels set by a user in a database of the database server;

the communication server is configured for acquiring audio information; extracting a feature value of the audio information; matching the extracted feature value with feature value models in the database of the database server; wherein, the database stores a correspondence between the feature value models and the forewarning levels; determining a forewarning level corresponding to the audio information based on a matching result; determining whether the forewarning level meets a preset condition; if the forewarning level meets the preset condition, determining notification information corresponding to the audio information; and outputting the notification information which is determined.

* * * * *